No. 707,399. Patented Aug. 19, 1902.
A. T. DAWSON & G. T. BUCKHAM.
GUN CARRIAGE.
(Application filed Feb. 11, 1902.)
(No Model.) 5 Sheets—Sheet 3.
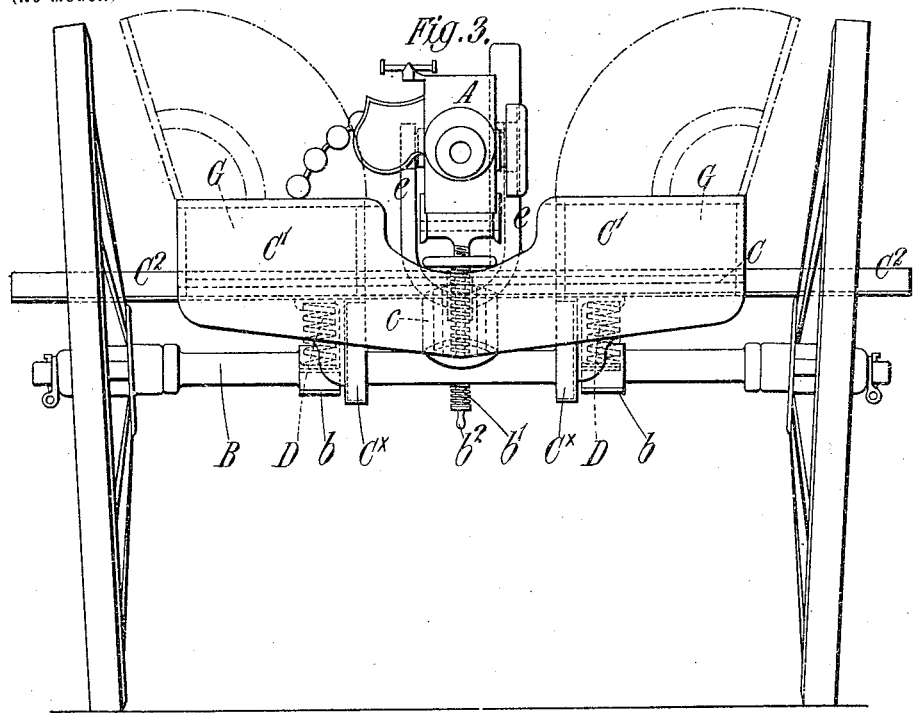
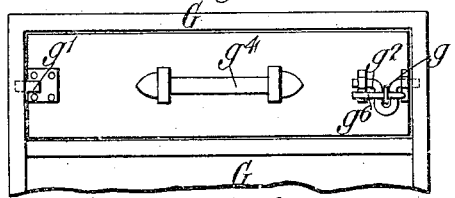
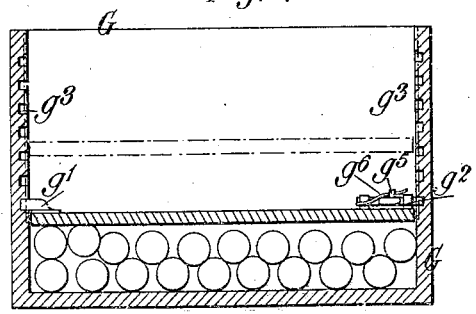
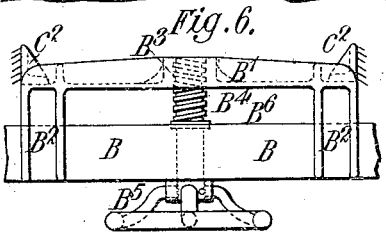
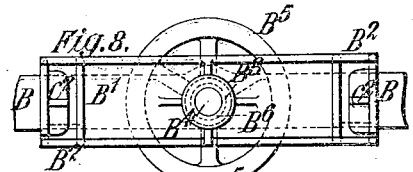
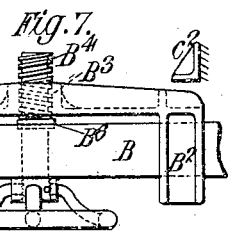
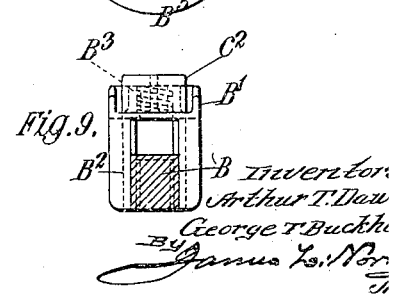
Witnesses:
N. L. Bogan
Chs. D. Kester
Inventors:
Arthur T. Daw[son]
George T. Buckh[am]
By James L. Nor[ris]

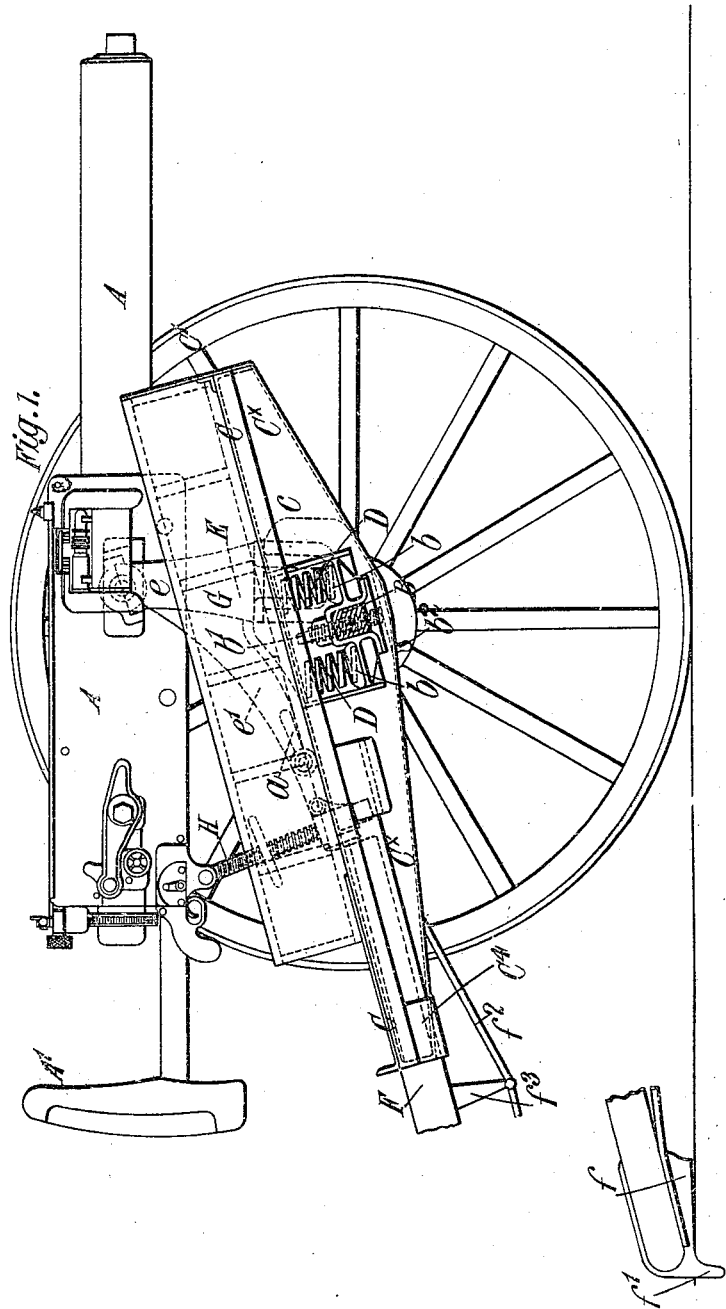

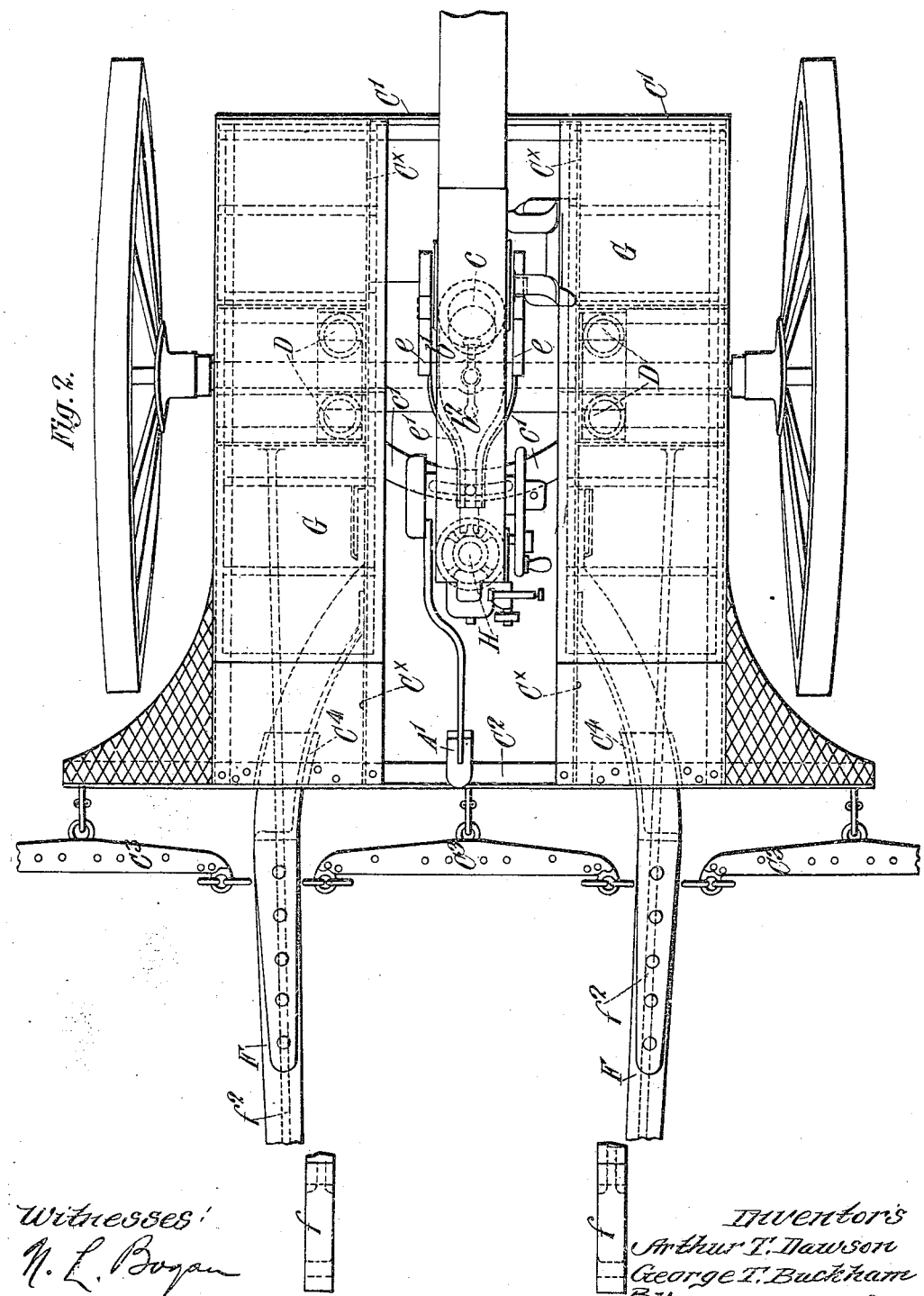

No. 707,399. Patented Aug. 19, 1902.
A. T. DAWSON & G. T. BUCKHAM.
GUN CARRIAGE.
(Application filed Feb. 11, 1902.)
(No Model.) 5 Sheets—Sheet 4.
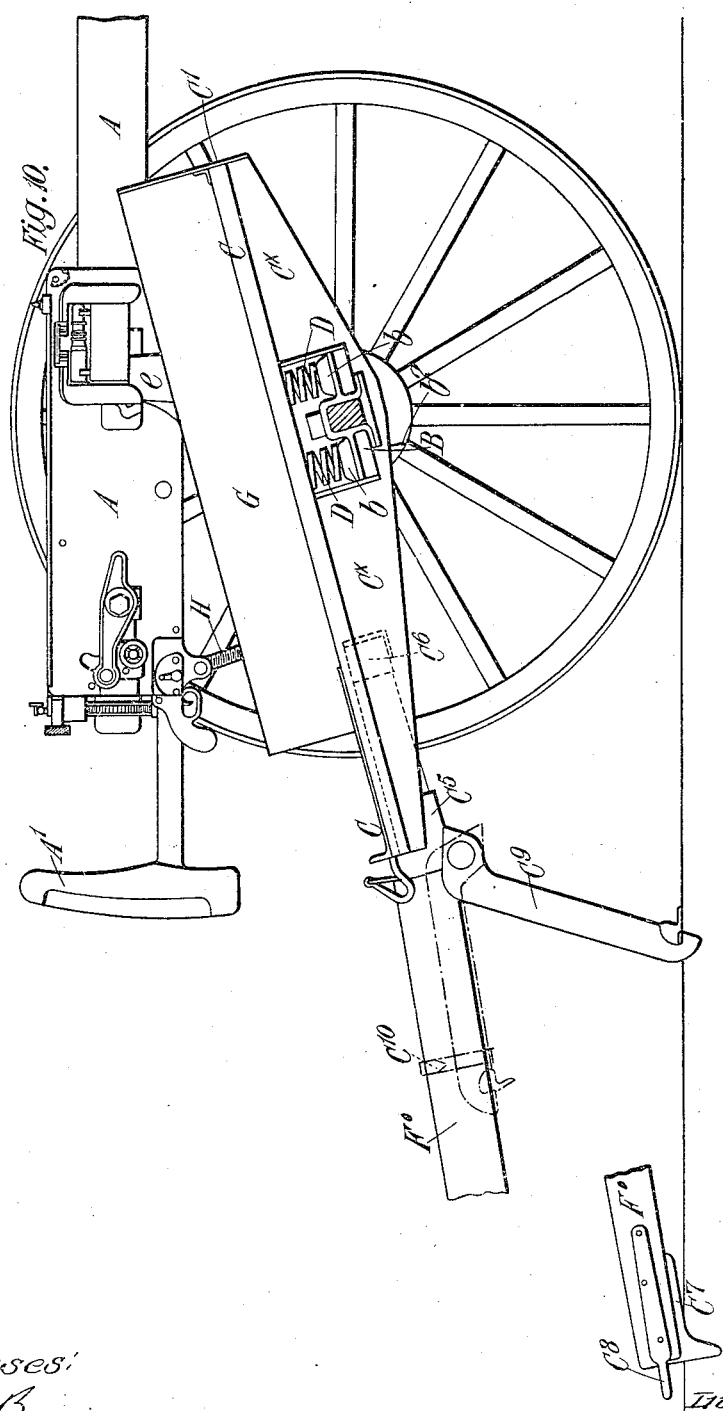
Witnesses:
Inventors
Arthur T. Dawson
George T. Buckham
By James L. Norris.

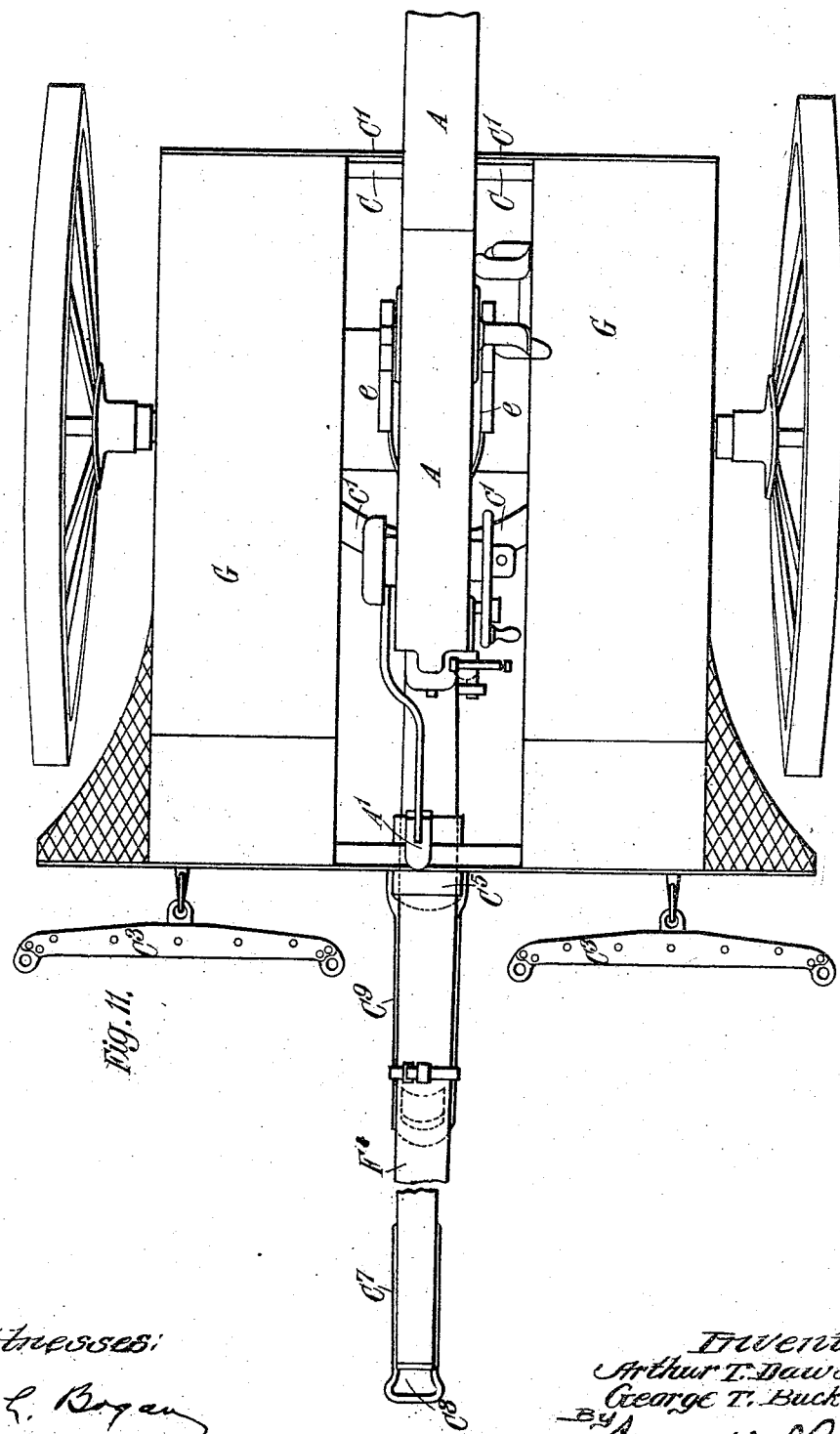

UNITED STATES PATENT OFFICE.

ARTHUR TREVOR DAWSON AND GEORGE THOMAS BUCKHAM, OF WEST-MINSTER, LONDON, ENGLAND, ASSIGNORS TO VICKERS SONS & MAXIM, LIMITED, OF WESTMINSTER, LONDON, ENGLAND.

GUN-CARRIAGE.

SPECIFICATION forming part of Letters Patent No. 707,399, dated August 19, 1902.

Application filed February 11, 1902. Serial No. 93,596. (No model.)

*To all whom it may concern:*

Be it known that we, ARTHUR TREVOR DAWSON, late lieutenant of Royal Navy, and GEORGE THOMAS BUCKHAM, engineer, residing at 32 Victoria street, London, England, subjects of the King of Great Britain, have invented certain new and useful Improvements in Gun Carriages or Mountings, of which the following is a specification.

This invention has reference to gun carriages or mountings, and is more particularly, although not exclusively, applicable to light mountings for guns of the class commonly termed "pom-poms" and other quick firers.

According to our invention the mounting is a two-wheeled carriage adapted to carry the gun and ammunition and is arranged to be drawn either by three or four horses. It has a steel frame built up of main girders and angle-irons suitably connected. Attached to the front of the said frame is a steel plate for the protection of the ammunition, and at the rear of the frame is a splinter-bar fitted with hooks to receive the singletrees and with brackets for the attachment of draft-shafts or a pole. When draft-shafts are used, they are provided with shoes at their outer ends and are stiffened with trussed stay-rods, which extend from the frame to the ends of the shafts. Props may be hinged to the frame and so arranged that they can be turned down to the ground to support the shafts when required. When a draft-pole is used, it is, like the shafts, provided with a shoe at its outer end. A hinged U-shaped stay or prop is also provided for assisting in supporting the pole when the gun is being fired.

The top carriage of the mounting is constructed with a socket secured between the main girders. It has a cross-head which receives the gun and which is pivoted in the socket and secured by a bolt and nut. The said cross-head has a rearward extension or arm for the support of the elevating-gear. This arm slides on a traversing segment located between the main girders and is provided with a clamping-screw to enable the cross-head to be secured in any position within the training limits.

The ammunition is carried in boxes secured on the top of the frame and divided into compartments so arranged that the gun can be fed directly from any of them. Each compartment may have an inner lid or cover provided with suitable catches for engaging with a series of holes or notches within the compartments, so that the said inner lid or cover can be adjusted in any desired raised or lowered position for keeping the ammunition securely packed, even if the rounds be partly expended.

The aforesaid frame of the carriage may be rigidly attached to the wheel-axle or supported on springs. When it is supported on springs, we provide a device for readily locking the axle and frame together during firing, thereby rendering the said springs temporarily inactive and the gun rigid.

In order that our said invention may be clearly understood and readily carried into effect, we will describe the same more fully with reference to the accompanying drawings, in which—

Figure 1 is a side elevation of a gun-carriage constructed in accordance with our invention, one of the wheels having been removed. Fig. 2 is a plan, and Fig. 3 a front elevation, of the said gun-carriage. Fig. 4 is a plan showing one of the compartments of the ammunition-boxes and its inner adjustable cover. Fig. 5 is a vertical section on the line 1 1 of Fig. 4. Figs. 6 and 7 are elevations of a portion of the wheel-axle, showing a slightly-modified form of the device employed for throwing the springs of the carriage into and out of action. Fig. 8 is a plan, and Fig. 9 an end elevation, of the said device. Fig. 10 is a side elevation of a modified form of the gun-carriage, and Fig. 11 is a plan thereof.

Like letters of reference indicate similar parts in all the figures.

A is the gun; B, the carriage-axle; C, the frame of the carriage. D D are the springs for supporting said frame on the axle. E is the top carriage; F, the draft-shafts. G G are the ammunition-boxes. Referring more particularly to Figs. 1 to 5, the said frame is provided at the front with the steel plate or shield C' and at the rear with the splinter-bar C², carrying the singletrees C³ C³ and the brackets C⁴ for the draft-shafts F. These shafts are provided with shoes $f$ $f$, having spades $f'$ to enter the ground when the shafts F are in firing position. The said shafts are stiffened with stay-rods $f^2$, which are stayed at suitable intervals by the pieces $f^3$.

The top carriage E is fitted into a socket $e$, situated between the main girders C˟ C˟ of the frame C, said carriage being furnished with a cross-head $e$, in which the gun is trunnioned, and also with a rearwardly-extending arm $e'$, connected with the screw H of the elevating-gear. The said arm is adapted to slide laterally over a fixed arc or segment $c'$, Fig. 2, when the gun is traversed by the gunner through the intervention of the crutch or shoulder-piece A', and said arm can be locked in any desired position on said segment $c'$ by a suitable clamp $a$, Fig. 1.

The ammunition-boxes G G are secured to the frame C upon opposite sides of the gun, and they are divided into compartments, each of which is provided with the inner lid or cover $g$. (See Figs. 4 and 5.) This cover is furnished with a stud $g'$ at one end and a bolt $g^2$ at the other end. The walls of the compartments adjacent to the ends of the cover are formed with a vertical series of notches $g^3$ $g^3$, with any of which said stud and bolt on the cover can be caused to engage, in accordance with the height to which said cover is to be adjusted. In the position in which said cover is represented by the full lines in Fig. 5 it is at its lowest point. By adjusting this cover in accordance with the amount of ammunition within the compartments said ammunition will be effectually prevented from unduly shaking about when the mounting is being moved from place to place. The said cover is also provided with a leather handle $g^4$ for facilitating its removal and adjustment. The said bolt $g^2$ is formed with a bent portion to engage with an eye $g^5$ when in its locking position, said bolt being retained in this position by a tongue $g^6$, passed through said eye.

The springs D, by which the frame of the carriage is resiliently supported on the axle B, bear at their lower ends upon socketed flanges $b$ $b$, Figs. 1 and 3, projecting radially from the axle, and at their upper ends said springs bear against sockets on the under side of the frame C. The girders C˟ are vertically slotted for the axle B to pass through, said slots also serving as guides for the frame as it vibrates on the axle when the springs are operative.

$b'$ is a screw-spindle, which extends vertically through the axle and is provided with a handle $b^2$ for revolving it. Its inner end can thus be caused to abut firmly against the under side of the frame C, and when in such position the said frame becomes locked to the axle, so that it cannot vibrate thereon. The springs are thus rendered temporarily inactive and the gun is firmly locked to the axle, so as to be rigid during firing. By turning said screw-spindle so as to bring its inner end away from the frame C the springs can be rendered operative again and the frame C becomes resilient with respect to the axle, as is necessary when the carriage is traveling.

In Figs. 6 to 9 we have shown a somewhat modified form of the device for rendering the springs D inoperative. In this case we provide a strong cross-piece B', having forked ends B² to slide vertically on the axle B. Midway of its length is a screw-threaded boss B³, with which the screw-spindle B⁴ engages. The lower end of this spindle passes vertically through the axle B and at its lower extremity receives a hand-wheel B⁵ for revolving it. This hand-wheel and a collar B⁶, carried by the screw-spindle at a point above the axle, prevent said spindle from moving longitudinally. Secured to the main girders C˟ of the frame C are brackets $c^2$ $c^2$, which are so situated that they occupy a position above and in alinement with the said cross-piece B'. Therefore when the cross-piece is elevated by revolving the screw-spindle B⁴ in the proper direction said cross-piece bears firmly against the under side of the said brackets (see Fig. 6) and prevents the frame C from vibrating on the axle B, or, in other words, renders the springs D inoperative. By revolving said screw-spindle in the opposite direction the cross-piece can be caused to descend into the position represented in Fig. 7, whereby the brackets $c^2$ are liberated and the said springs D permitted to become operative.

Referring now to Figs. 10 and 11, the draft-shafts are substituted by a draft-pole F', which is firmly secured in brackets C⁵ C⁶ on the frame C. It is provided with a shoe C⁷, which has a spade to enter the ground when the pole is in firing position. It also has an eye C⁸ for "limbering up." The aforesaid bracket C⁵ has hinged thereto the prop or stay C⁹, which when in the lowered position (represented by the full lines in Fig. 10) enters the ground and assists in supporting the pole in the firing position. This stay is of ∪-shaped cross-section, so that when out of use it can be turned up about its hinge to lie snugly against the pole F', as represented by the dotted lines in Fig. 10. In this position it is retained by a strap C¹⁰ or other appropriate means. In other respects the carriage illustrated by these figures is similar to that illustrated by Figs. 1 to 5, and therefore needs no further description.

What we claim, and desire to secure by Letters Patent of the United States, is—

1. In a gun-carriage, the combination with the wheel-axle and the frame, of springs interposed between said axle and frame, a cross-piece capable of sliding vertically on said axle, a screw-spindle carried by the axle and adapted to actuate said cross-piece when revolved, and brackets on the frame against which said cross-piece can be caused to firmly abut substantially as and for the purpose specified.

2. In a gun-carriage, the combination with the wheel-axle and the frame, of a draft-pole secured in brackets on said frame, a spade-shoe and a limbering-up eye at the outer end of said pole, a hinged prop of U-section on one of said brackets and means for retaining said prop in its raised position when the carriage is traveling substantially as described.

3. In a gun-carriage, the combination with the wheel-axle and the frame, of ammunition-boxes carried by the frame on opposite sides of the gun and divided into compartments, adjustable inner lids or covers within said compartments and means for locking said lids in the desired adjusted position relatively to the ammunition in the compartments substantially as and for the purpose described.

4. In a gun-carriage, the combination with the wheel-axle and the frame, of ammunition-boxes carried by the frame on opposite sides of the gun and divided into compartments, adjustable inner lids or covers within said compartments, a stud at one end of each of said lids and a bolt at the other end for engaging with a series of vertical notches within the compartments, an eye on the lid for a curved portion of the bolt to engage with, a tongue for passing through said eye to retain the bolt in its engaging position and a handle for facilitating the movement of said lid substantially as and for the purpose described.

In testimony whereof we have hereunto set our hands, in presence of two subscribing witnesses, this 30th day of January, 1902.

ARTHUR TREVOR DAWSON.
GEORGE THOMAS BUCKHAM.

Witnesses:
CHRISTOPHER TURNER,
HENRY KING.